US010336399B2

(12) United States Patent
Boulton

(10) Patent No.: US 10,336,399 B2
(45) Date of Patent: Jul. 2, 2019

(54) STEERING ASSEMBLY FOR A MOTORCYCLE HAVING A CONTINUOUSLY VARIABLE TRANSMISSION

(71) Applicant: Radial Engine Innovations Holding LLC, North Canton, OH (US)

(72) Inventor: Charles Mitchell Boulton, North Canton, OH (US)

(73) Assignee: Radial Engine Innovations Holding LLC, North Canton, OH (US)

(*) Notice: Subject to any disclaimer, the term of this patent is extended or adjusted under 35 U.S.C. 154(b) by 67 days.

(21) Appl. No.: 15/475,695

(22) Filed: Mar. 31, 2017

(65) Prior Publication Data

US 2017/0203810 A1 Jul. 20, 2017

Related U.S. Application Data

(63) Continuation-in-part of application No. 15/231,856, filed on Aug. 9, 2016, now Pat. No. 9,828,061, which is a continuation of application No. 14/832,076, filed on Aug. 21, 2015, now Pat. No. 9,463,847.

(60) Provisional application No. 62/041,369, filed on Aug. 25, 2014.

(51) Int. Cl.
| | |
|---|---|
| *B62K 25/12* | (2006.01) |
| *B62K 21/04* | (2006.01) |
| *B62D 7/06* | (2006.01) |
| *B62K 11/04* | (2006.01) |
| *B62M 7/02* | (2006.01) |
| *B62M 11/10* | (2006.01) |
| *B62M 11/12* | (2006.01) |
| *B62K 21/02* | (2006.01) |
| *B62K 25/04* | (2006.01) |

(52) U.S. Cl.
CPC ............... *B62K 25/12* (2013.01); *B62D 7/06* (2013.01); *B62K 11/04* (2013.01); *B62K 21/02* (2013.01); *B62K 21/04* (2013.01); *B62M 7/02* (2013.01); *B62M 11/10* (2013.01); *B62M 11/12* (2013.01); *B62K 25/04* (2013.01)

(58) Field of Classification Search
CPC ........ B62K 25/12; B62K 25/04; B62K 25/16; B62K 25/18
See application file for complete search history.

(56) References Cited

U.S. PATENT DOCUMENTS

| | | | |
|---|---|---|---|
| 4,727,794 A | 3/1988 | Kmicikiewicz | |
| 4,756,547 A * | 7/1988 | Trema | B62K 21/005 180/219 |
| 4,785,905 A * | 11/1988 | Trema | B62K 21/005 180/219 |
| 5,121,936 A | 6/1992 | Cowan | |
| D434,047 S * | 11/2000 | Ballentine | D12/114 |
| 6,230,836 B1 | 5/2001 | Cowan | |

(Continued)

*Primary Examiner* — Kevin Hurley
(74) *Attorney, Agent, or Firm* — Sand, Sebolt & Wernow Co., LPA

(57) ABSTRACT

Provided is a motorcycle including a frame, a front ground-engaging wheel, rear ground-engaging wheel and a steering assembly. The steering assembly includes handlebars, an upper steering stem, a lower steering stem and a lever assembly intermediate the upper steering stem and the lower steering stem and wherein the steering assembly is operably connected to the front ground-engaging wheel.

19 Claims, 7 Drawing Sheets

(56) References Cited

U.S. PATENT DOCUMENTS

| | | | |
|---|---|---|---|
| 6,517,095 B1 * | 2/2003 | Lansac | B62K 25/24 |
| | | | 280/276 |
| 6,769,384 B2 | 8/2004 | Dougherty | |
| 7,806,217 B2 * | 10/2010 | Hasegawa | B62K 25/24 |
| | | | 180/219 |
| 7,849,949 B2 | 12/2010 | Arnold | |
| 8,162,342 B2 * | 4/2012 | Chen | B62K 25/24 |
| | | | 280/276 |
| 8,215,439 B2 | 7/2012 | Sugitani et al. | |
| 8,347,993 B2 | 1/2013 | Ishida | |
| 8,407,995 B2 | 4/2013 | Cho et al. | |
| 8,494,728 B2 | 7/2013 | Unno | |
| 8,696,499 B2 | 4/2014 | Ishida et al. | |
| 9,783,259 B2 * | 10/2017 | Taguma | B60G 15/00 |
| 9,988,123 B2 * | 6/2018 | Hull | B62K 21/22 |
| 2003/0005894 A1 | 1/2003 | Dougherty | |
| 2007/0163831 A1 * | 7/2007 | Stevens | B62K 11/04 |
| | | | 180/219 |
| 2007/0272466 A1 * | 11/2007 | Levey | B62M 7/02 |
| | | | 180/219 |
| 2014/0296008 A1 | 10/2014 | Wu | |
| 2014/0315670 A1 | 10/2014 | Mariotti et al. | |

* cited by examiner

STEERING ASSEMBLY FOR A MOTORCYCLE HAVING A CONTINUOUSLY VARIABLE TRANSMISSION

CROSS-REFERENCE TO RELATED APPLICATIONS

This application is a continuation-in-part of U.S. patent application Ser. No. 15/231,856, filed Aug. 9, 2016, which is a continuation of U.S. patent application Ser. No. 14/832,076, filed on Aug. 21, 2015, now U.S. Pat. No. 9,463,847, which claims priority from U.S. Provisional Application Ser. No. 62/041,369, filed Aug. 25, 2014, the disclosures of which are incorporated herein by reference.

BACKGROUND

Technical Field

The present disclosure relates to a steering assembly. More particularly, the present disclosure relates to a steering assembly for a motorcycle having a continuously variable transmission system. Specifically, the present disclosure relates to a steering assembly which reduces the amount of front-end dive associated with braking of a motorcycle.

Background Information

Conventional motorcycle steering mechanisms typically include a front suspension mechanism which aids in braking and handling of the motorcycle. As a motorcycle brakes, the load on the front wheel increases while the load on the rear wheel decreases. This load transfer can cause a motorcycle to "dive" which, in most cases, is undesirable.

An example of brake diving occurs when a motorcycle utilizes a typical telescopic fork suspension system. If a motorcycle is equipped with telescopic forks, the additional load on the front wheel is transferred through the forks, which compress. This compression causes the front end of the motorcycle to lower in direction and undergo a brake dive. Brake dive can cause handling and braking problems in addition to making a rider feel as if they are going to be thrown over the front of the motorcycle.

Providing a steering assembly with reduced dive associated with braking has proved difficult and thus there exists a need in the art for a steering assembly which reduces dive associated with braking.

BRIEF SUMMARY

Issues continue to exist with steering assemblies for motorcycles, thus, a need exists for an improved steering assembly for a motorcycle which reduces the front-end dive associated with braking of a motorcycle. The present disclosure addresses these and other issues.

In one aspect, the disclosure may provide a motorcycle comprising a motorcycle frame, at least two ground-engaging wheels operatively connected to the motorcycle frame and a steering assembly. The steering assembly comprises handlebars, an upper steering stem, a lower steering stem and a lever assembly intermediate the upper steering stem and the lower steering stem. The steering assembly is operably connected to the front ground-engaging wheel.

In one aspect, the disclosure may provide a method comprising providing a motorcycle having a steering assembly, wherein the steering assembly supports a throttle and a clutch lever and further comprises handlebars, an upper steering stem, a lever assembly and a lower steering stem operably connected to at least one ground-engaging wheel. The method includes effecting the radial engine by actuating the throttle on the steering mechanism. The method includes engaging the continuously variable transmission by actuating the clutch lever on the steering mechanism. The method includes driving the motorcycle forward with the operator straddling the saddle seat and steering the motorcycle with the steering assembly.

In one aspect, the disclosure may provide a motorcycle including a frame, a front ground-engaging wheel, rear ground-engaging wheel and a steering assembly. The steering assembly includes handlebars, an upper steering stem, a lower steering stem and a lever assembly intermediate the upper steering stem and the lower steering stem and wherein the steering assembly is operably connected to the front ground-engaging wheel.

BRIEF DESCRIPTION OF THE SEVERAL VIEWS OF THE DRAWINGS

One or more preferred embodiments that illustrate the best mode(s) are set forth in the drawings and in the following description. The appended claims particularly and distinctly point out and set forth the disclosure.

The accompanying drawings, which are incorporated in and constitute a part of the specification, illustrate various example methods, and other example embodiments of various aspects of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Similar numbers refer to similar parts throughout the drawings.

DETAILED DESCRIPTION

Figure 1:
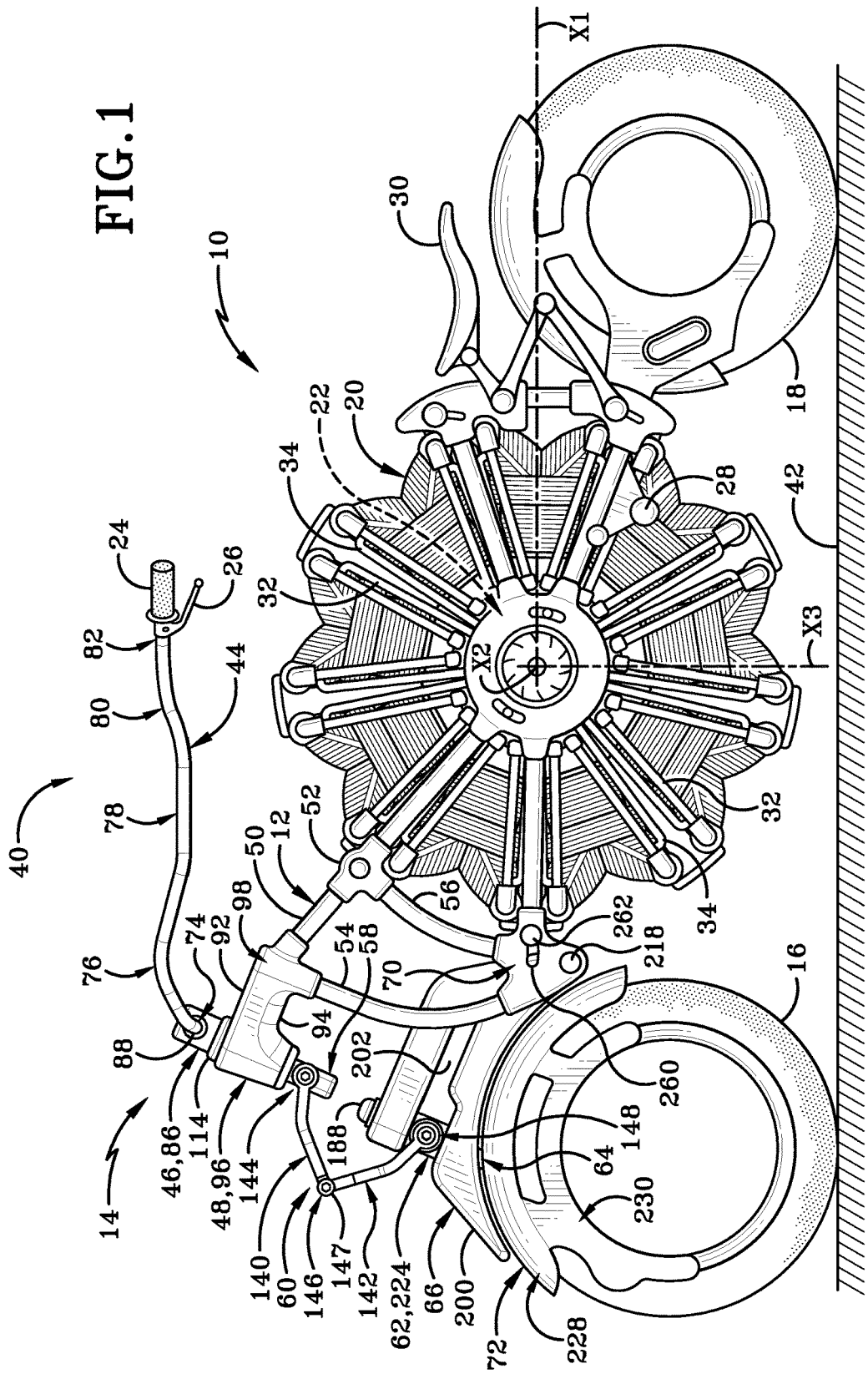
FIG. 1 (FIG. 1) is a side elevational view of a motorcycle having a steering assembly in accordance with one embodiment of the present disclosure.

As shown in FIG. 1, one embodiment of the present disclosure may include a motorcycle 10 having a frame 12, a steering assembly 14, a front ground-engaging wheel 16 and a rear ground-engaging wheel 18. The frame 12 supports a radial engine 20 via a generally rigid connection and supports a continuously variable transmission 22.

The front and rear wheels 16, 18 may be a hubless configuration. The steering assembly 14 may further include a throttle 24 for actuating radial engine 20 and a clutch lever 26 for actuating an element, such as a clutch, in transmission 22. Motorcycle 10 further includes a foot peg 28 for resting a rider's foot and a saddle or seat 30 for resting a rider's body. Radial engine 20 includes a series of air intake tubes 32 for receiving fresh air into engine 20 and a series of air exhaust tubes 34 for expelling exhaust air out of engine 20.

In accordance with one aspect of the disclosure, the motorcycle 10 extends in a longitudinal direction between the front ground-engaging wheel 16 and the rear ground-engaging wheel 18, and defines a longitudinal axis X1 that extends along the center of the motorcycle between the front ground-engaging wheel 16 and the rear ground-engaging wheel 18. The motorcycle 10 extends in a transverse direction between a right side 36 of the motorcycle 10 and a left side 38 of the motorcycle 10, and defines a transverse axis X2 that extends from the right side 36 of the motorcycle 10 to the left side 38 of the motorcycle 10. The motorcycle 10 extends in a vertical direction from a top side 40 of the motorcycle 10 to the ground 42, and defines a vertical axis X3 that extends from the top side 40 of the motorcycle 10 to the ground 42.

As shown in FIGS. 1-6A, steering assembly 14 may include handlebars 44, a top tree 46, a neck 48, a pair of upper frame tubes with one upper frame tube shown as 50 and the other upper frame tube not shown, a pair of upper knuckles with one upper knuckle shown as 52 and the other upper knuckle not shown, a first pair of inner frame tubes with one inner frame tube shown as 54 and the other inner frame tube not shown, a second pair of inner frame tubes with one of the inner frame tubes shown as 56 and the other inner frame tube not shown, an upper steering stem 58, a lever assembly 60, a bottom tree 62, a lower steering stem 64, a front arm 66, a bumper 188 a pair of pivot knuckles with one pivot knuckle shown as 70 and the other pivot knuckle not shown and a front fender 72.

In one aspect according to the present disclosure, handlebars 44 include a straight center section 74, a first curved section 76, a first elongated straight section 78, a second curved section 80, a first grip section 82, a third curved section 84, a second elongated straight section (not shown), a fourth curved section (not shown) and a second grip section (not shown).

The first curved section 76, the first elongated straight section 78, the second curved section 80 and the first grip section 82 are located transversely left of the motorcycle 10. The third curved section, the second elongated straight section, the fourth curved section and the second grip section are located transversely right of the motorcycle 10.

The first curved section 76 is located symmetrically opposite of the third curved section. The first elongated straight section 78 is located symmetrically opposite of the second elongated straight section. The second curved section 80 is located symmetrically opposite of the fourth curved section. The first grip section 82 is located symmetrically opposite of the second grip section.

In one aspect according to the present disclosure, the straight center section 74 is disposed between the first curved section 76 and the third curved section 84. The first curved section 76 is disposed between the straight center section 74 and the first elongated straight section 78. The first elongated straight section 78 is disposed between the first curved section 76 and the second curved section 80. The second curved section 80 is disposed between the first elongated straight section 78 and the first grip section 82.

The third curved section 84 is disposed between the straight center section 74 and the second elongated straight section. The second elongated straight section is disposed between the third curved section and the fourth curved section. The fourth curved section is disposed between the second elongated straight section and the second grip section.

The first curved section 76 extends from the straight center section 74 rearwardly and vertically along an arcuate path at an angle relative to the longitudinal axis X1 of the motorcycle 10. The angle may be any suitable angle. The first curved section 76 extends towards the first straight elongated section 78 rearwardly and downwardly along an arcuate path at an angle relative to the longitudinal axis X1 of the motorcycle 10. The angle may be any suitable angle. The first curved section 76 is at a higher elevation relative to the elevation of the straight center section 74.

The first elongated straight section 78 extends from the first curved section 76 towards the second curved section 80 rearwardly and vertically at an angle relative to the longitudinal axis X1 of the motorcycle 10. The angle may be any suitable angle. The first elongated section 78 is at a higher elevation relative to the elevation of the first curved section 76.

The second curved section 80 extends from the first elongated section 78 rearwardly and vertically along an arcuate path at an angle relative to the longitudinal axis X1 of the motorcycle 10. The angle may be any suitable angle. The second curved section 80 extends towards the first grip section 82 rearwardly and downwardly along an arcuate path at an angle relative to the longitudinal axis X1 of the motorcycle 10. The angle may be any suitable angle. The second curved section 80 is at a higher elevation relative to the elevation of the first straight elongated section 78.

The first grip section 82 extends from the second curved section 80 rearwardly and vertically at an angle relative to the longitudinal axis X1 of the motorcycle 10. The angle may be any suitable angle. The first grip section 82 is at a higher elevation relative to the elevation of the second curved section 80.

The third curved section 84 extends from the straight center section 74 rearwardly and vertically along an arcuate path at an angle relative to the longitudinal axis X1 of the motorcycle 10. The angle may be any suitable angle. The third curved section 84 extends towards the second straight elongated section rearwardly and downwardly along an arcuate path at an angle relative to the longitudinal axis X1 of the motorcycle 10. The angle may be any suitable angle. The third curved section 84 is at a higher elevation relative to the elevation of the straight center section.

The second elongated straight section extends from the third curved section 84 towards the fourth curved section rearwardly and vertically at an angle relative to the longitudinal axis X1 of the motorcycle 10. The angle may be any suitable angle. The second elongated section is at a higher elevation relative to the elevation of the third curved section 84.

The fourth curved section extends from the second elongated section rearwardly and vertically along an arcuate path at an angle relative to the longitudinal axis X1 of the motorcycle 10. The angle may be any suitable angle. The fourth curved section extends towards the second grip section rearwardly and downwardly along an arcuate path at an angle relative to the longitudinal axis X1 of the motorcycle 10. The angle may be any suitable angle. The fourth curved section is at a higher elevation relative to the elevation of the second straight elongated section.

The second grip section extends from the fourth curved section rearwardly and vertically at an angle relative to the longitudinal axis X1 of the motorcycle 10. The angle may be any suitable angle. The second grip section is at a higher elevation relative to the elevation of the fourth curved section.

The handlebars 44 are rigidly connected to the top tree 46 and upper steering stem 58 in any suitable manner. Handlebars 44 may include any suitable structure configured to be operably connected to the front ground-engaging wheel 16 and further configured to allow comfortable manipulation by a rider.

Typically, motorcycle handlebars, which may be a unitary member or integrally formed, are made from hollow tubing shaped to a particular desired structure and are typically made of aluminum alloys, chrome plated steel, carbon fiber or titanium. Further, the first grip section 82 and second grip section may include any suitable structure configured to ergonomically conform to a rider's hand. It should be kept in mind that the above examples are only presented by way of example and should not be construed as limiting the disclosure in any manner whatsoever, including, but not limited to, limiting the handlebars 44, or any part thereof, to any particular composition or configuration.

While handlebars 44 are depicted as having straight and curved sections extending vertically and angularly with respect to the longitudinal axis X1 of the motorcycle 10 in this disclosure, such configurations should not be limiting and as one of ordinary skill in the art would understand, other standard and non-standard configurations of motorcycle handlebars may be suitable.

In one aspect according to the present disclosure, the top tree 46 includes a body 86 defining a transversely horizontal bore 88 extending the width thereof. The transversely horizontal bore 88 is sized so that the handlebars 44 may be inserted therein. The transversely horizontal bore 88 is cylindrical and includes a generally circular longitudinal cross-section with a diameter adapted to receive the handlebars 44.

The body 86 further includes a bottom portion 90 defining a threaded hole 91 extending at least partially within the body 86 of the top tree 46. The threaded hole 91 is sized so that the upper steering stem 58 may be inserted therein.

The handlebars 44 are rigidly anchored within the top tree 46 and are operably connected to the upper steering stem 58 in any suitable manner. The upper steering stem 58 is rigidly anchored within the top tree 46 and operably connected to the handlebars 44 in any suitable manner. While the top tree 46 is depicted as having a transversely horizontal bore 88 and a threaded hole 91, the top tree 46 may include any suitable structure configured to be operably connected to the handlebars 44 and the upper steering stem 58. The top tree 46 is rigidly connected to the neck 48.

The neck 48 includes a generally triangular-shaped upwardly facing top surface 92 and a generally triangular-shaped and concave downwardly facing bottom surface 94. The neck 48 further includes a first corner 96, a second corner 98 and a third corner 100. Each corner, 96, 98, 100 is formed from a generally semi-cylindrical sidewall.

Figure 5:
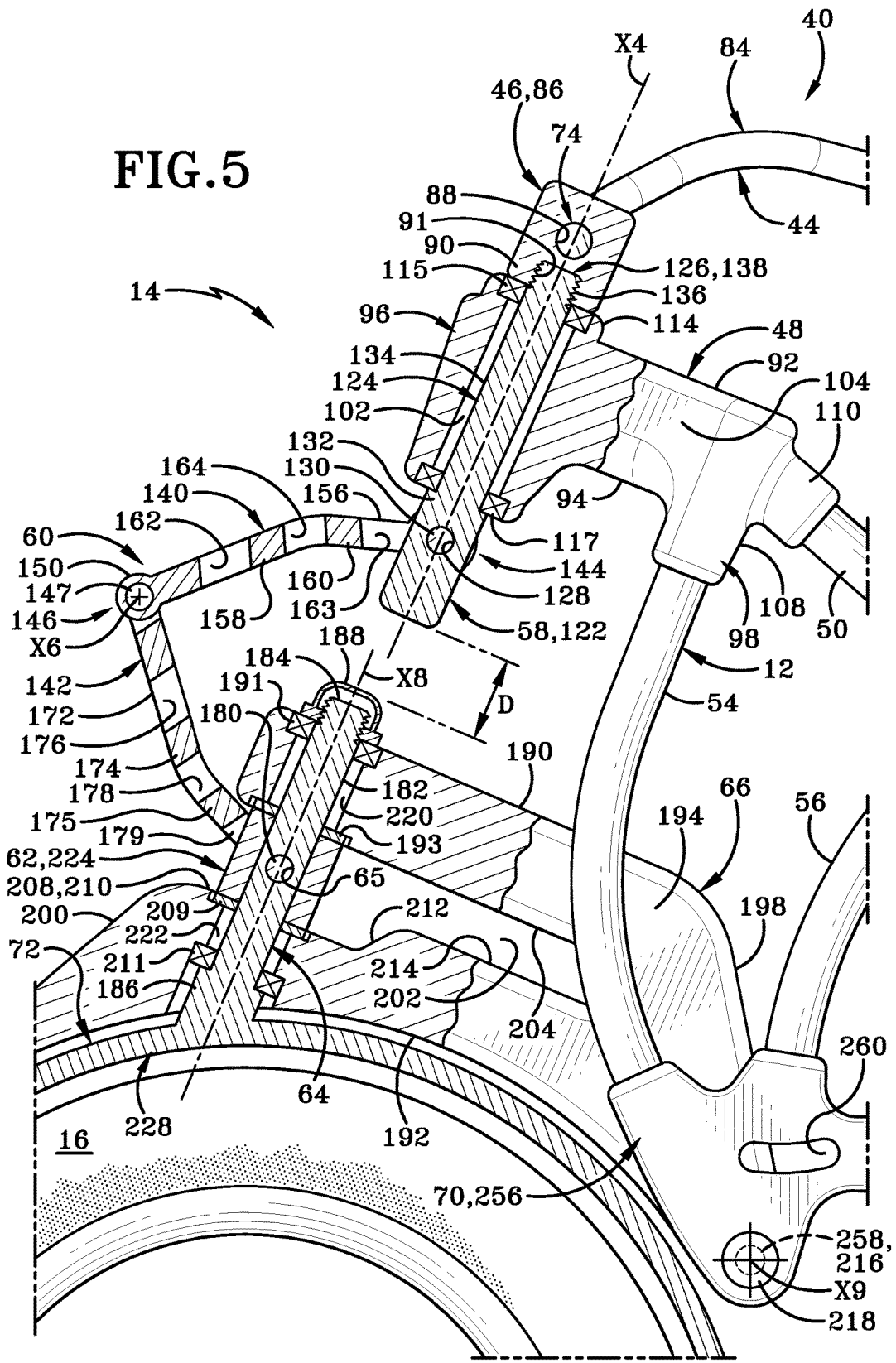
FIG. 5 (FIG. 5) is a cross-sectional view of the steering assembly in accordance with one embodiment of the present disclosure taken along line 5-5 of FIG. 2.

As shown in FIG. 5, The first corner 96 defines a vertical bore 102 extending at least partially upward from the bottom surface 94. The vertical bore 102 is sized so that the upper steering stem 58 may be inserted therein. The vertical bore 102 is generally cylindrical and includes a generally circular cross-section with a diameter adapted to receive a portion of the upper steering stem 58.

The second corner 98 defines a vertical recess (not shown) extending at least partially upward from the bottom surface 96. The vertical recess is sized so that the inner frame tube 54 may be inserted therein. The vertical recess includes a generally circular cross-section with a diameter adapted to receive one the inner frame tube 54.

The third corner 100 defines a vertical recess (not shown) extending at least partially upward from the bottom surface 94. The vertical recess is sized so that the other inner frame tube may be inserted therein. The vertical recess includes a generally circular cross-section with a diameter adapted to receive the other inner frame tube.

The neck 48 further includes a first surface 104, a second surface 106 and a back surface 108 facing rearward of the motorcycle 10. The back surface 108 includes a first neck connecting portion 110 and a second neck connecting portion 112. The first neck connecting portion 110 defines a longitudinally horizontal recess (not shown) extending at least partially within the back surface 108. The longitudinally horizontal recess is sized so that the upper fame tube 50 may be inserted therein. The longitudinally horizontal recess is generally cylindrically shaped and includes a generally circular cross-section with a diameter adapted to receive the upper frame tube 54.

The second neck connecting portion 112 defines a longitudinally horizontal recess (not shown) extending at least partially within the back surface 108. The longitudinally horizontal recess is sized so that the other upper fame tube 54 may be inserted therein. The longitudinally horizontal recess is generally cylindrically shaped and includes a generally circular cross-section with a diameter adapted to receive the other upper frame tube.

The generally triangular-shaped upwardly facing top surface 92 is connected with a flange 114 for supporting the top tree 46. The flange 114 is generally annular and includes a generally circular cross-section with a diameter adapted to engage the bottom portion 90 of the top tree 46 so that the bottom portion 90 of the top tree 46 may be rigidly connected to the flange 114. A bearing 115 is disposed within the flange 114 which rotationally engages the bottom portion 90 of the top tree 46. As one of ordinary skill in the art would understand, any suitable type of bearing or bearing assembly may be used.

The opposite end of the upper frame tube 50 is rigidly connected to the upper knuckle 52 located generally to the transverse left side of the motorcycle 10. The other upper frame tube is rigidly connected to the other upper knuckle generally to the transverse right side of the motorcycle 10 in the same manner that the upper frame tube 50 is connected to the upper knuckle 52 in symmetrical opposition of one another. Upper knuckle 52 and the other upper knuckle each include a body 116 defining a longitudinally horizontal bore 118 extending the length thereof. The longitudinally horizontal bore 118 is sized so that the upper frame tube 50 may be inserted therein. The longitudinally horizontal bore 118 includes a generally circular cross-section with a diameter adapted to receive the upper frame tube 50.

The body 116 further includes a bottom portion 120 defining a vertical recess (not shown) extending at least partially within the body 116 of the upper knuckle 50 located transversely left of the motorcycle 10. The vertical recess is sized so that the inner frame tube 56 may be inserted therein. The other inner frame tube is rigidly connected to the other upper knuckle transversely right of the motorcycle 10 in the same manner that the inner frame tube 56 is connected to the upper knuckle 52 in symmetrical opposition of one another. The vertical recess is cylindrical and includes a generally circular cross-section with a diameter adapted to receive the inner frame tube 56.

The neck 48 is positioned under the top tree 46 and above the upper steering stem 58. The neck 48 is oriented such that the outer surface of the semi-cylindrical sidewall of the first corner 96 extends longitudinally forward towards the front of the motorcycle 10. The first and second neck connecting portions 110, 112 of the back surface 108 extend longitudinally rearwardly towards the rear of the motorcycle 10. The first surface 104 of the neck 48 faces transversely to the left of the motorcycle 10 and the second surface 106 of the neck 48 faces transversely to the right of the motorcycle 10.

The neck 48 may include any suitable structure configured to be operably connected to the upper steering stem 58, to support a rigid connection of the neck 48 between the top tree 46 and the upper steering stem 58 and to support the first pair of inner frame tubes 54 (the other inner frame tube is not shown) and the pair of upper frame tubes 50 (the other upper frame tube is not shown) via a rigid connection.

As shown in FIG. 5, the upper steering stem 58 includes a first portion 122, a second portion 124 and a third portion 126. The first portion 122 is generally rectangular with rounded corners. The first portion 122 defines a longitudinally horizontal bore 128 extending the length thereof. The longitudinally horizontal bore 128 is sized so that a frame pin 130 may be inserted therein. The longitudinally horizontal bore 128 includes a generally circular cross-section with a diameter adapted to receive the frame pin 130. The first portion 122 further includes a shoulder 132 which rotationally engages a bearing 117. As one of ordinary skill in the art would understand, any suitable type of bearing or bearing assembly may be used.

The second portion 124 includes a generally cylindrical sidewall 134. The second portion 124 is disposed between the first portion 122 and the third portion 126. The diameter of the cylindrical sidewall 134 of the second portion 124 is smaller than the diameter of the first portion 122.

The third portion 126 includes threads 136 on its outer surface to engage with the threaded hole 91 and an end 138 as shown in FIG. 5. The cross-section of third portion 126 corresponds to the cross-section of the vertical recess of the top tree 46 and is adapted to extend within the vertical recess of the top tree 46. The third portion 126 of the upper steering stem 58 is rigidly connected to the top tree 46 and the handlebars 44 in any suitable manner.

The upper steering stem 58 defines a first steering axis X4 of the handlebars 44 about which the handlebars 44 are angularly displaced for steering the motorcycle 10.

The upper steering stem 58 may include any suitable structure configured to be operably connected to the neck 48, top tree 46, handlebars 44 and the lever assembly 60 and further configured to support the neck 48 in a rigid connection between the upper steering stem 58 and the top tree 46.

Figure 2:
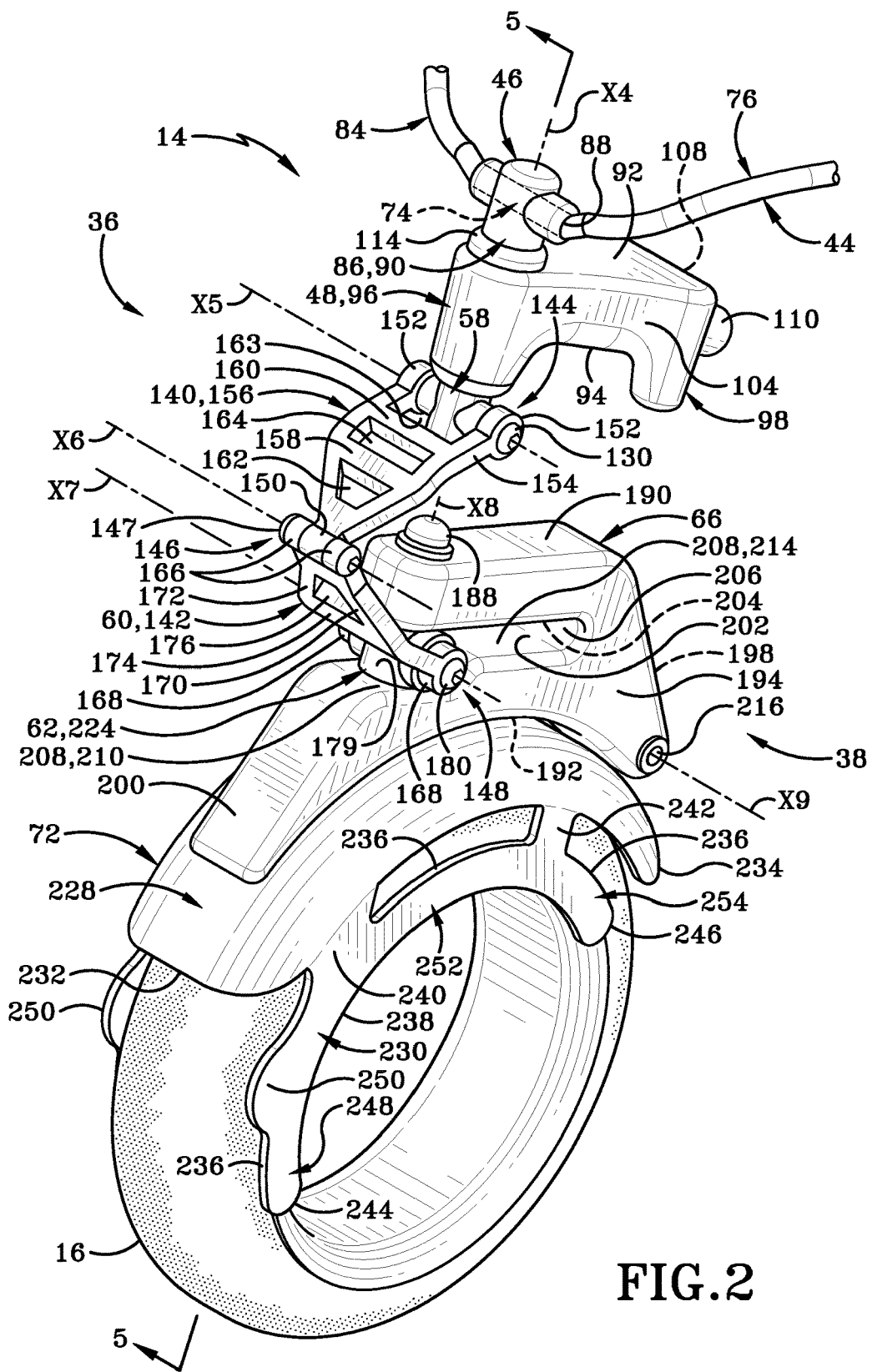
FIG. 2 (FIG. 2) is an isometric perspective view of the left side of the steering assembly in accordance with one embodiment of the present disclosure.
Figure 3:
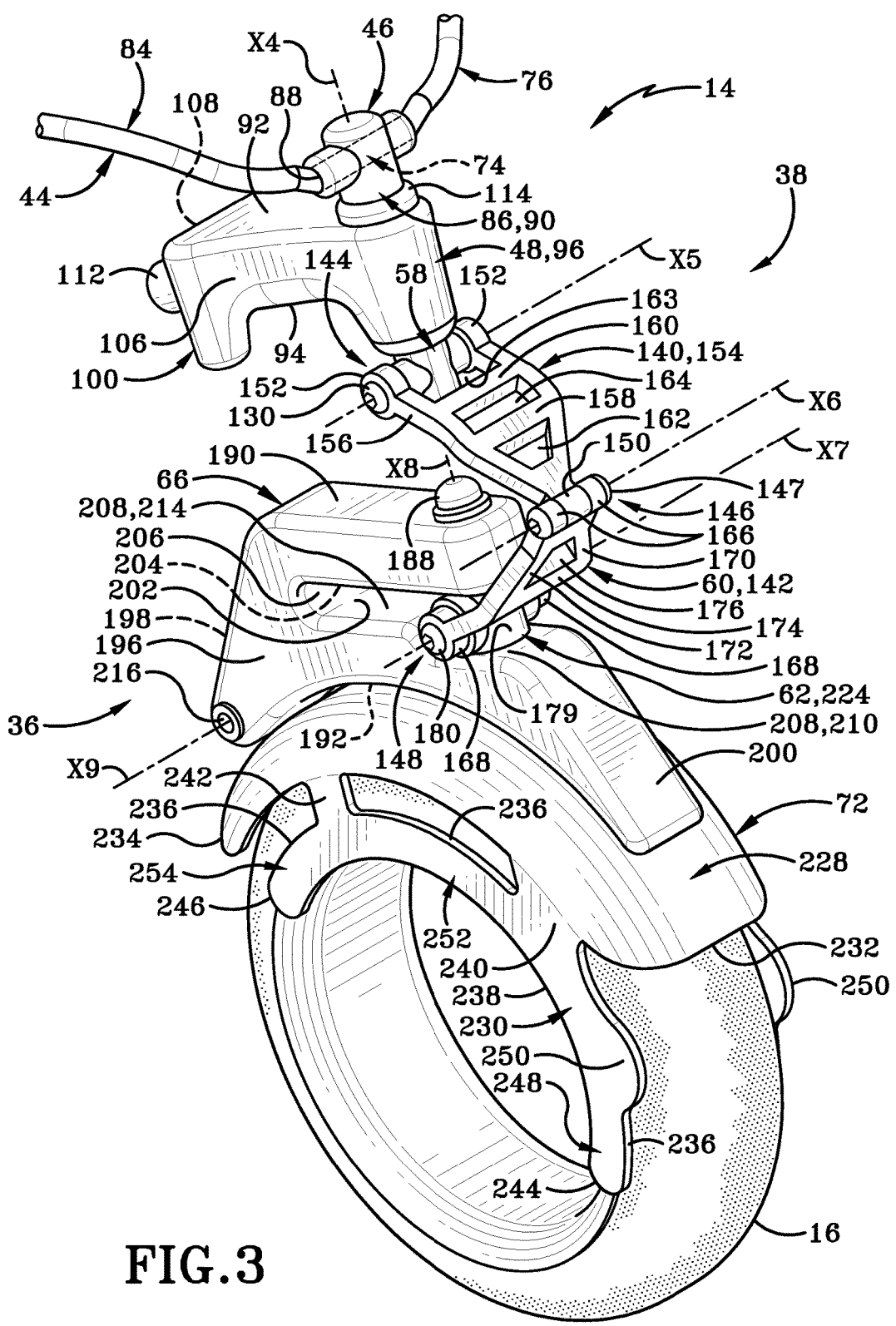
FIG. 3 (FIG. 3) is an isometric perspective view of the right side of the steering assembly in accordance with one embodiment of the present disclosure.
Figure 4:
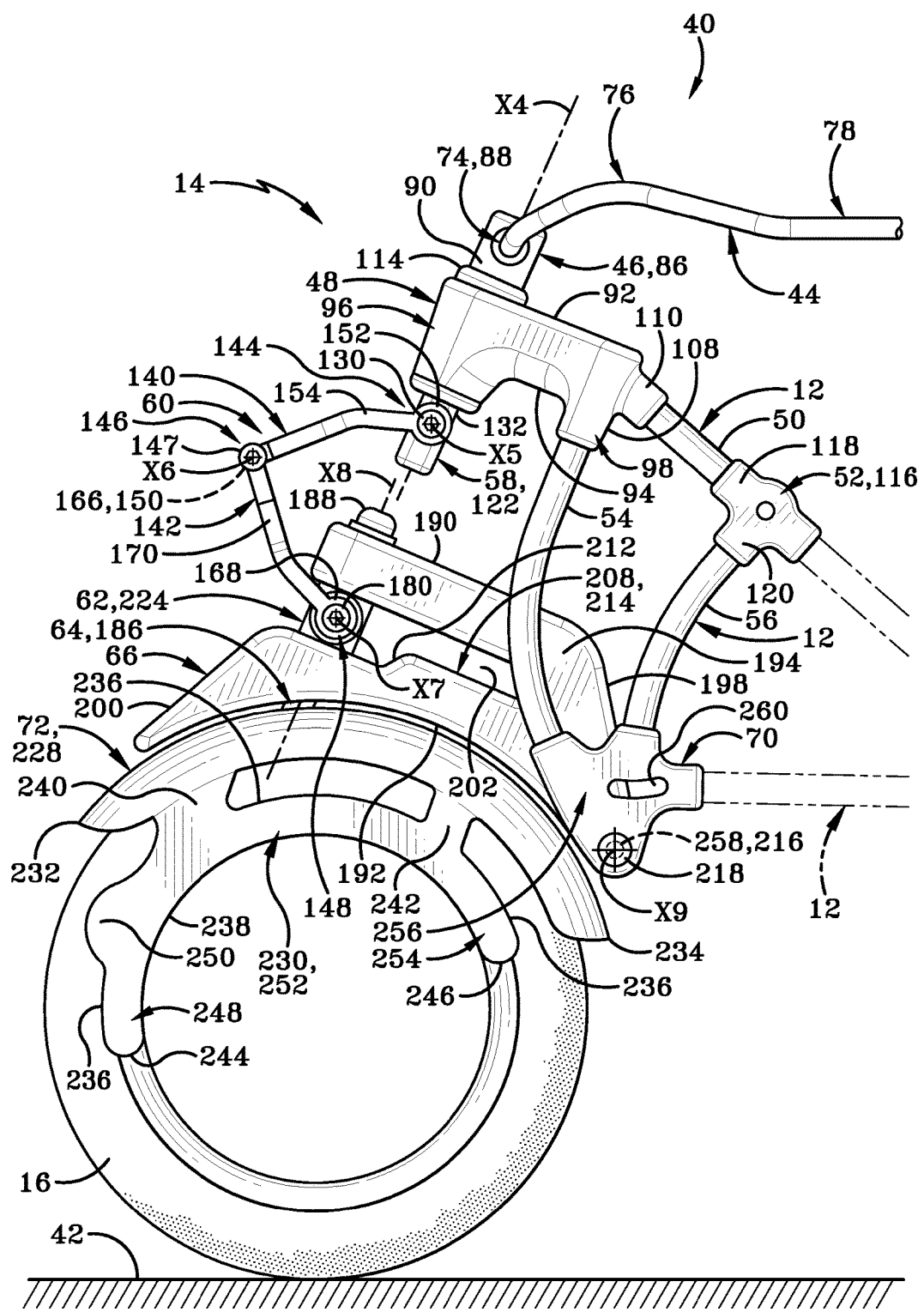
FIG. 4 (FIG. 4) is a partly cut-away side elevation view of the left side of the steering assembly in accordance with one embodiment of the present disclosure.

As shown in FIG. 2, the lever assembly 60 includes an upper arm 140, a lower arm 142, an upper connection point 144, a central pivot point 146 and a lower connection point 148.

The upper arm 140 includes a first upper connecting portion 150, a second upper connecting portion 152, a first upper section 154, a second upper section 156, a first rod 158 and a second rod 160. The first upper section 154 is disposed generally transverse to the left side of the motorcycle 10 and extends from the first upper connecting portion 150 of the upper arm 140 near the central pivot point 146 of the lever assembly 60 rearwardly and vertically at an angle relative to the longitudinal axis X1 of the motorcycle 10 towards the second upper connecting portion 152 of the upper arm 140. The angle may be any suitable angle.

The second upper section 156 is disposed generally transverse to the right side of the motorcycle 10 and extends from the first upper connecting portion 150 of the upper arm 140 near the central pivot point 146 of the lever assembly 60 rearwardly and vertically at an angle relative to the longitudinal axis X1 of the motorcycle 10 towards the second upper connecting portion 152 of the upper arm 140. The angle may be any suitable angle.

The first rod 158 extends transversely from the first upper section 154 to the second upper section 156. The first rod 158 defines a first generally triangular-shaped aperture 162 between the first upper section 154, second upper section 156 and central pivot point 146 of the lever assembly 60. The second rod 160 extends transversely from the first upper section 154 to the second upper section 156. The second rod 160 defines a first generally trapezoidal-shaped aperture 164 between the first upper section 154, second upper section 156 and the first rod 158. The first generally trapezoidal-shaped aperture 164 is disposed rearward of the first triangular-shaped aperture 162. The second rod further defines a first generally rectangular-shaped aperture 163 between the first upper section 154, second upper section 156 and the second upper connecting portion 150.

The lower arm 142 includes a first lower connecting portion 166, a second lower connecting portion 168, a first lower section 170, a second lower section 172, a third rod 174 and a fourth rod (not shown). The first lower section 170 is disposed generally transverse to the left side of the motorcycle 10 and extends from the first lower connecting portion 166 of the lower arm 142 near the central pivot point 146 of the lever assembly 60 rearwardly and vertically at an angle relative to the longitudinal axis X1 of the motorcycle 10 towards the second lower connecting portion 168 of the lower arm 142. The angle may be any suitable angle.

The second lower section 172 is disposed generally transverse to the right side of the motorcycle 10 and extends from the first lower connecting portion 168 of the lower arm 142 near the central pivot point 146 of the lever assembly 60 rearwardly and vertically at an angle relative to the longitudinal axis X1 of the motorcycle 10 towards the second lower connecting portion 168 of the lower arm 142. The angle may be any suitable angle.

The third rod 174 extends transversely from the first lower section 170 to the second lower section 172. The third rod 174 defines a second generally triangular-shaped aperture 176 between the first lower section 170, second lower section 172 and central pivot point 146 of the lever assembly 146. The fourth rod extends transversely from the first lower section 170 to the second lower section 172. The fourth rod defines a second generally trapezoidal-shaped aperture (not shown) between the first lower section 170, second lower section 172 and the third rod 174. The second generally trapezoidal-shaped aperture is disposed rearward of the second triangular-shaped aperture 176. The fourth rod further defines a second generally rectangular-shaped aperture 179 between the first lower section 170, second lower section 172 and the second lower connecting portion 168.

In one embodiment according to the present disclosure, the upper arm 140 is substantially identical to the lower arm 142 and the upper arm 140 is disposed in symmetrical opposition to the lower arm 142 as shown in FIGS. 1-6.

The upper arm 140 of the lever assembly 60 is pivotally connected to the upper steering stem 58 at the upper connection point 144 by the frame pin 130 and is pivotal around a first pivot axis X5 and a second pivot axis X6 as shown in FIG. 2.

The upper arm 140 of the lever assembly 60 is pivotally connected at the central pivot point 46 to the lower arm 142 of the lever assembly 60 by a frame pin 147. The lower arm 142 of the lever assembly 60 is pivotally connected at the central pivot point 46 to the upper arm 140 of the lever assembly 60 by the frame pin 147 and is pivotal around the second pivot axis X6 and a third pivot axis X7. The lower arm 142 of the lever assembly 60 is pivotally connected to the bottom tree 62 and the lower steering stem 64 at the lower connection point 148 by a frame pin 180 and is pivotal about the third axis X7.

The lever assembly 60 may include any suitable structure configured to be operably connected to the upper steering stem 58, the handlebars 44, the bottom tree 62 and the lower steering stem 64. Further, any suitable type of fastener may be used for the pivotal connections, including, but not limited to, frame pins through a bore.

As shown in FIG. 5, the lower steering stem 64 includes a generally cylindrical sidewall 182, a proximal end 184 and a distal end 186. The lower steering stem 64 extends from its distal end 186 from the front fender 72 rearwardly and vertically at an angle relative to the vertical axis X3 of the motorcycle 10. The lower steering stem 64 extends through the front arm 66 and the bottom tree 62. The lower steering stem 64 is rigidly connected to the lever assembly 60, the bottom tree 62, the front fender 72 and the front arm 66 in any suitable manner. The lower steering stem 64 further includes a bumper 188 disposed on the proximal end 184 and proximal end 184 includes threads to engage with the bumper 188 as shown in FIG. 5.

The lower steering stem 64 defines a second steering axis X8 of the front ground-engaging wheel 16 about which the front ground-engaging wheel 16 is angularly displaced for steering the motorcycle 10. In one exemplary embodiment according to the present disclosure, the second steering axis X8 is positioned forwardly from the first steering axis X4. In this embodiment, the second steering axis X8 is offset parallel to the first steering axis X4. The offset distance between the second steering axis X8 and the first steering axis X4 may be in a range from about one inch to about six inches. More particularly, the offset distance between the second steering axis X8 and the first steering axis X4 may be equal to the radius of the cylindrical bore defined by sidewall 134.

Although a particular alignment position of the second steering axis X8 and the first steering axis X4 has been described, the alignment position of the second steering axis X8 in relation to the first steering axis X4 may be any suitable alignment position. For example, and not meant as a limitation, the second steering axis X8 may be positioned rearwardly from the first steering axis X4. In this embodiment, the second steering axis X8 may be offset parallel to the first steering axis X4. The offset distance between the second steering axis X8 and the first steering axis X4 may be in a range from about one inch to about six inches. More particularly, the offset distance between the second steering axis X8 and the first steering axis X4 may be equal to the radius of the cylindrical bore defined by sidewall 134.

The lower steering stem 64 may include any suitable structure configured to be rigidly connected to the lever assembly 60, the bottom tree 62, the front fender 72 and the front arm 66.

As shown in FIGS. 2-6A, the front arm 66 includes an upwardly facing top surface 190, bearings 191, 211, a downwardly facing arcuate bottom surface 192, bearing plates 193, 211, a first surface 194, a second surface 196, a back surface 198 and a front edge 200. The first surface 194 faces transversely to the left of the motorcycle 10 and the second surface 196 faces transversely to the right of the motorcycle 10. The back surface 198 faces longitudinally rearward towards the rear of the motorcycle 10. The front edge 200 faces longitudinally forward towards the front of the motorcycle 10. The downwardly facing arcuate bottom surface 192 extends longitudinally forward from the back surface 198 to the front edge 200.

The front arm 66 further includes a recess 202 formed between the top surface 190 and the bottom surface 192. The recess 202 extends from the front edge 200 rearwardly into a portion of the first surface 190 and the second surface 192. The recess 202 forms an intermediate downwardly facing top surface 204, an intermediate semi-circular middle surface 206 and an intermediate upwardly facing bottom surface 208. The intermediate downwardly facing top surface 204 extends from the front edge 200 rearwardly towards the intermediate semi-circular middle surface 206. The intermediate downwardly facing top surface 204 is generally planar.

The intermediate upwardly facing bottom surface 208 includes a first section 210, a second section 212 and a third section 214. The first section 210 extends rearwardly from the front edge 200 and is disposed between the front edge 200 and the second section 212. The second section 212 is disposed between the first section 210 and third section 214. The third section 214 is disposed between the second section 212 and the intermediate semi-circular middle surface 206.

The first section 210 is generally planar. The second section 212 extends rearwardly and vertically at an angle relative to the vertical axis X3 of the motorcycle 10. The angle may be any suitable angle. The third section 214 is generally planar. The intermediate semi-circular middle surface 206 is semi-circular and connects the intermediate downwardly facing top surface 204 to the intermediate upwardly facing bottom surface 208. The first section 210 is adapted to rigidly connect the bottom tree 62 between the intermediate downwardly facing top surface 204 and the first section 210.

The first surface 190 of the front arm 66 and the second surface 192 of the front arm 66 define a transversely horizontal bore 216. The transversely horizontal bore 216 is sized so that a frame pin 218 may be inserted therein. The transversely horizontal bore 216 is generally cylindrically shaped and includes a generally circular cross-section with a diameter adapted to receive the frame pin 218. The front arm 66 is pivotally connected to the pivot knuckle 70 on the transverse left side of the motorcycle 10 and is pivotally connected to the other pivot knuckle on the transverse right side of the motorcycle 10. The front arm 66 is adapted to pivot about a fourth pivot axis X9. The upwardly facing top surface 190 and the intermediate downwardly facing top surface 204 define a vertical bore 220 as shown in FIG. 5. The vertical bore 220 is sized so that the lower steering stem 64 may be inserted therein. The vertical bore 220 includes a generally circular cross-section with a diameter adapted to receive the lower steering stem 64.

The intermediate upwardly facing bottom surface 208 and the downwardly facing arcuate bottom surface 192 define a vertical bore 222. The vertical bore 222 is sized so that the lower steering stem 64 may be inserted therein. The vertical bore 222 includes a generally circular cross-section at the intermediate upwardly facing bottom surface 192 and a generally elliptical cross-section at the downwardly facing arcuate bottom surface 208 with a diameter adapted to receive the lower steering stem 64.

In one aspect according to the present disclosure, the bottom tree 62 includes a body 224 defining a transversely horizontal bore 65 extending the width thereof. The transversely horizontal bore is sized so that the frame pin 180 may be inserted therein. The transversely horizontal bore 65 includes a generally circular cross-section with a diameter adapted to receive the frame pin 180. The frame pin 180 operably connects the lower arm 142 of the lever assembly 60 to the bottom tree 62 and the lower steering stem 64.

The body 224 further defines a vertical bore (not shown) extending the length thereof. The vertical bore is sized so that the lower steering stem 64 may be inserted therein. The vertical bore includes a generally circular cross-section with a diameter adapted to receive the lower steering stem 64. The bottom tree 62 is disposed between the intermediate downwardly facing top surface 204 and the first section 210 of the intermediate upwardly facing bottom surface 208.

The bearings 191, 209 and the bearing plates 193, 209 are adapted to rotationally engage the lower steering stem 64. As one of ordinary skill in the art would understand, any suitable type of bearing, bearing plate or bearing assembly may be used.

In one aspect according to the present disclosure, and as shown in FIGS. 1-6A, the front fender 72 includes a generally arcuate top portion 228 and a first portion 230. The generally arcuate top portion 228 includes a proximal end 232 and a distal end 234. The generally arcuate top portion 228 extends from the proximal end 232 rearwardly and downwardly towards the distal end 234 along an arcuate path.

The first portion 230 includes a top edge 236, a bottom edge 238, a first connecting portion 240, a second connecting portion 242, a proximal end 244 and a distal end 246. The bottom edge 238 of the first portion 230 extends from the proximal end 244 rearwardly and vertically along an arcuate path at an angle relative to the vertical axis X3 of the motorcycle 10. The angle may be any suitable angle. The bottom edge 238 continues along the arcuate path rearwardly and downwardly until it meets its distal end 246.

The first portion 230 further includes a first section 248, a semi-circular protrusion 250, a second section 252 and a third section 254. The first section 248 is disposed between the proximal end 244 and the semi-circular protrusion 250. The semi-circular protrusion 250 is disposed between the first section 248 and the first connecting portion 240. The first connecting portion 240 is disposed between the semi-circular protrusion 250 and the second section 252. The second section 252 is disposed between the first connecting portion 240 and the second connecting portion 242. The second connecting portion 242 is disposed between the second section 252 and the third section 254. The third section 254 is disposed between the second connecting portion 242 and the distal end 246.

The first portion 230 extends from the proximal end 244 rearwardly and vertically along an arcuate path at an angle relative to the vertical axis X3 of the motorcycle 10 towards the semi-circular protrusion 250. The semi-circular protrusion 250 extends rearwardly towards the first connecting portion 240. The first connecting portion 240 is rigidly connected to the front fender 72. The second section 252 extends from the first connecting portion 240 rearwardly and downwardly along an arcuate path at an angle relative to the longitudinal axis X1 of the motorcycle 10 towards the second connecting portion 242. The angle may be any suitable angle. The second connecting portion 242 is rigidly connected to the front fender 72. The third section 254 extends rearwardly and downwardly along an arcuate path at an angle relative to the longitudinal axis X1 of the motorcycle 10 until it meets with the distal end 246. The angle may be any suitable angle.

In one aspect according to the present disclosure, the pivot knuckle 70 is located transversely left of the motorcycle 10. The pivot knuckle 70 is rigidly connected to the inner frames tubes 54, 56, pivotally connected to the front arm 66 and operably connected to the frame 12 of the motorcycle 10. The other pivot knuckle is located transversely right of the motorcycle 10 and is connected to the other inner frame tubes, the front arm 66 and another frame pin in a similar manner and in symmetrical opposition to the pivot knuckle 70.

The pivot knuckle 70 includes a body 256. The body 256 defines an angular recess (not shown), a vertical recess (not shown), a longitudinally horizontal recess (not shown), a transversely horizontal bore 258 and a longitudinally horizontal slot 260. The angular recess is angled relative to the vertical axis of the motorcycle 10 at any suitable angle. The angular recess is sized so that the inner frame tube 54 may be inserted therein. The angular recess includes a generally circular cross-section with a diameter adapted to receive the inner frame tube 54.

The vertical recess is sized so that the inner frame tube 56 may be inserted therein. The vertical recess includes a generally circular cross-section with a diameter adapted to receive the inner frame tube 56.

The longitudinally horizontal recess is sized so that a portion (not shown) of the frame 12 may be inserted therein. The longitudinally horizontal recess is cylindrically shaped and includes a generally circular cross-section with a diameter adapted to receive the portion of the frame 12.

The longitudinally horizontal slot 260 is sized so that a frame pin 262 may extend therethrough. The frame pin 262 is slidable along the longitudinally horizontal slot 260.

Figure 6:
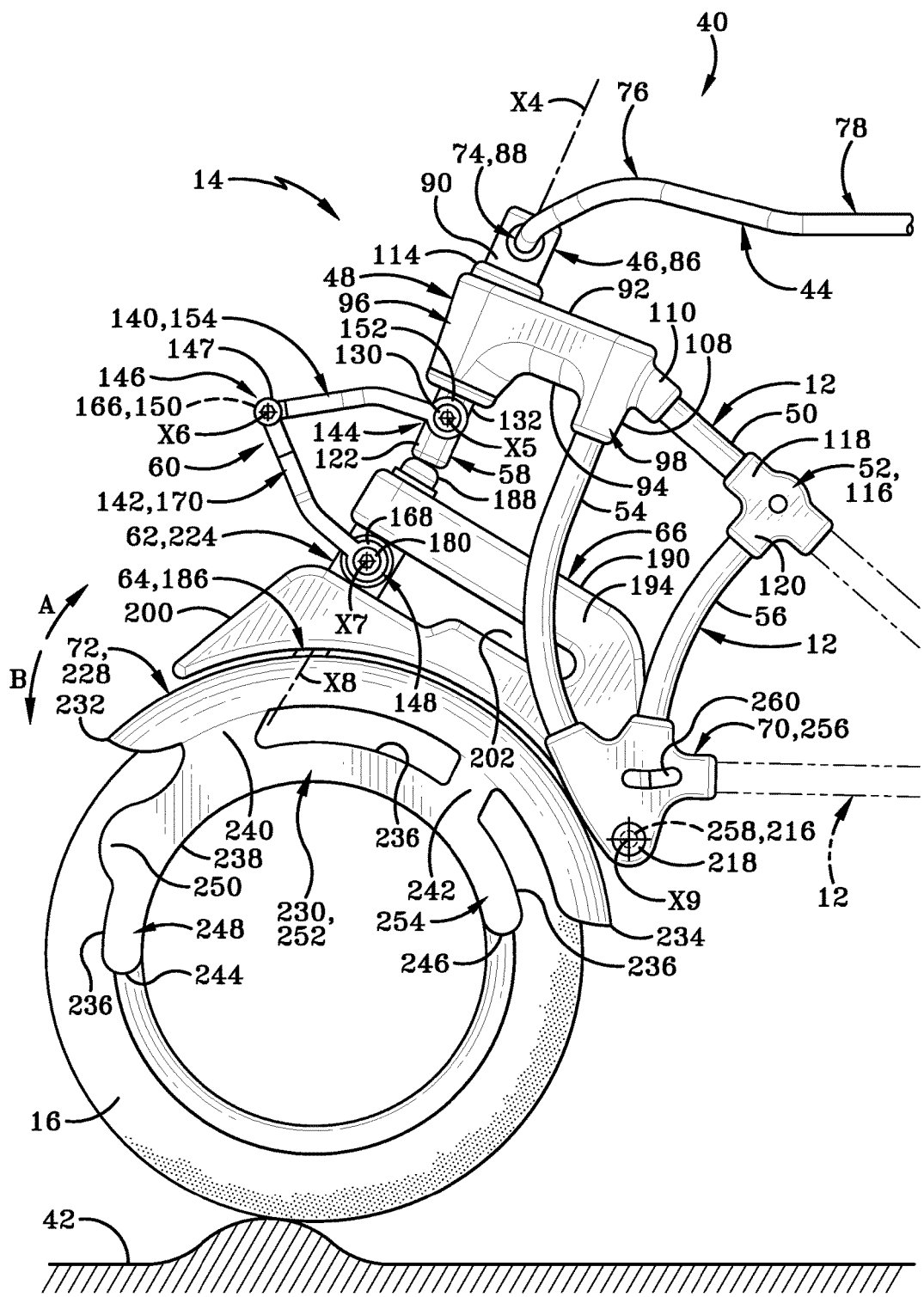
FIG. 6 (FIG. 6) is a partly cut-away side elevation view of the left side of the steering assembly where the lever assembly is in a compressed position in accordance with one embodiment of the present disclosure.

The transversely horizontal bore 258 is sized so that a frame pin 218 may extend therethrough. The pivot knuckle 70 is pivotable about the fourth pivot axis X9 as shown in FIG. 6 and as described below. The other pivot knuckle (not shown) is substantially identical to the pivot knuckle 70 and is adapted to operate in a similar manner.

In accordance with one aspect of the present disclosure, steering assembly 14 allows a rider to steer a motorcycle 10 while reducing the amount of front-end dive associated with braking of the motorcycle 10.

In operation, and with primary reference to FIGS. 2-6A, steering is accomplished by turning the handlebars 44 which rotates the upper steering stem 58 and the lower steering stem 64 as described below, and in turn causes the entire steering assembly 14, including the handlebars 44 and front ground-engaging wheel 16, to rotate about the first and second steering axes X4, X8 respectively.

Particularly, and in accordance with one embodiment of the present disclosure, the handlebars 44 are operably connected to the upper steering stem 58. The upper steering stem 58 is operably connected to the lever assembly 60. The lever assembly 60 is operably connected to the lower steering stem 64. The lower steering stem 64 is operably connected to the front fender 72. The front fender 72 is operably connected to the front ground-engaging wheel 16.

In response to turning the handlebars 44, the upper steering stem 58 rotates in the same direction as the handlebars 44 about the first steering axis X4. This rotation causes the lever assembly 60 to rotate in the same direction as the upper steering stem 58 about the first steering axis X4 and the second steering axis X8 as described below. This rotation causes the lower steering stem 64 to rotate in the same direction as the lever assembly 60 about the second steering axis X8. This rotation causes the front fender 72 to rotate in the same direction as the lower steering stem 64 about the second steering axis X8. This rotation causes the front ground-engaging wheel 16 to rotate in the same direction as the front fender 72 about the second steering axis X8. The handlebars 44 may be turned transversely left or right of the motorcycle 10 to steer the motorcycle 10 in a desired direction.

In operation, and with reference to FIGS. 4-6A, steering assembly 14 is configured to reduce the amount of front-end dive associated with braking of the motorcycle 10. The lever assembly 60 may have relaxed and compressed positions which allow for the resilient deflection of the front ground-engaging wheel 16 as further described below.

As the front ground-engaging wheel 16 is in contact with a uniform surface in a road 42, the lever assembly 60 is in the relaxed position as shown in FIG. 5. When the lever assembly 60 is in the relaxed position, the upper steering stem 58 is separated from the bumper 188 of the lower steering stem 64 by a distance D as shown in FIG. 5. The distance D may be any suitable distance.

Figure 6A:
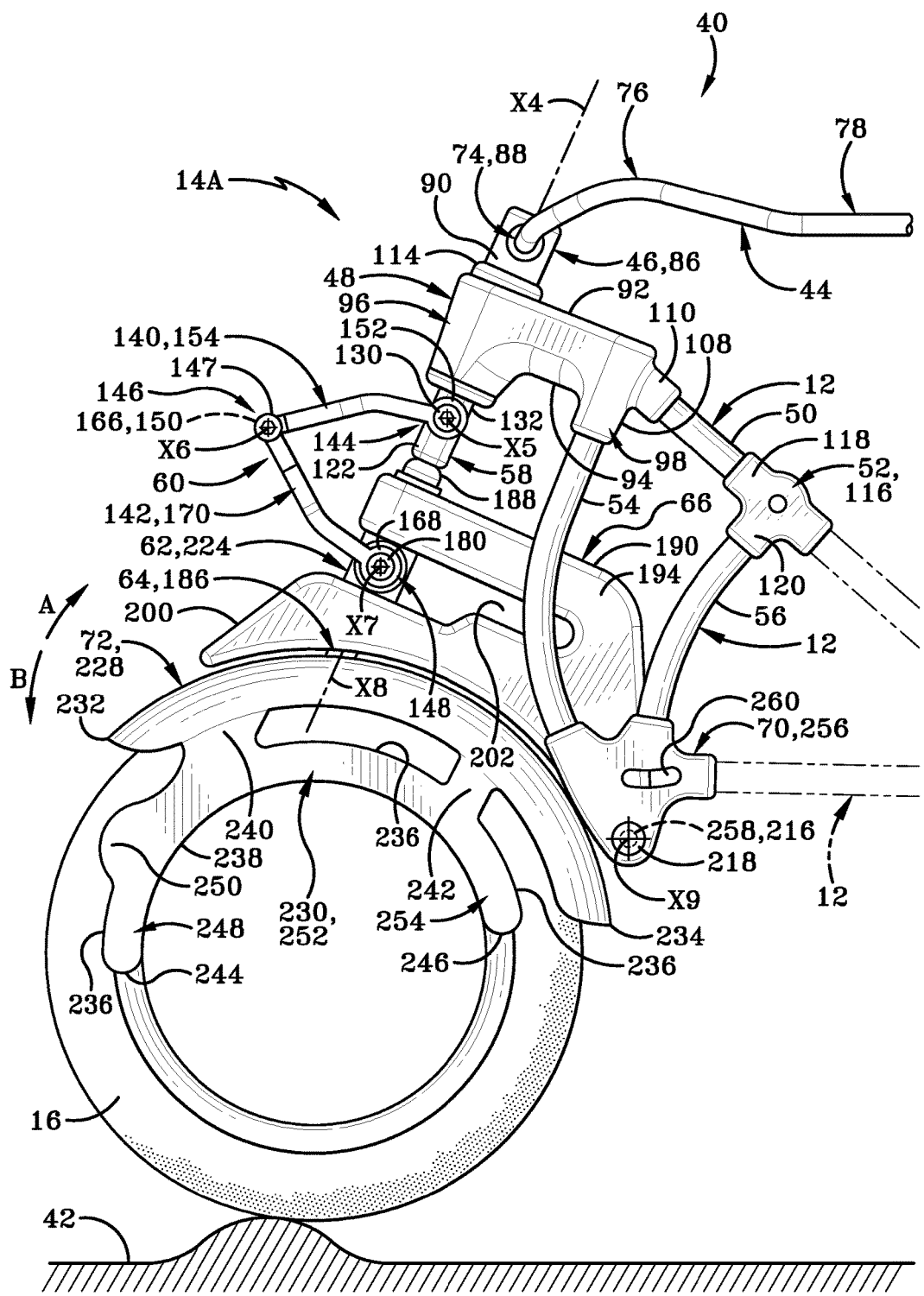
FIG. 6A (FIG. 6A) is a partly cut-away side elevation view of the left side of the steering assembly where the lever assembly is in a compressed position in accordance with another embodiment of the present disclosure.

As the front ground-engaging wheel 16 encounters a non-uniform surface in the road 42, the front ground-engaging wheel 16 is deflected vertically upward at an angle relative to the vertical axis X3 of the motorcycle 10 as shown by arrow A in FIG. 6. The angle may be any suitable angle. This deflection causes the lever assembly 60 to compress and pivot about the first, second and third pivot axes X5, X6 and X7. This compression causes the lower arm 142 of the lever assembly 60 to pivot about the second pivot axis X6 and raise the lower steering stem 64, the front fender 72 and the front ground-engaging wheel 16 in the angled vertically upward direction in response to the deflections. Further, in this embodiment, the first steering axis X4 and the second steering axis X8 are aligned so that the bumper 188 engages the upper steering stem 58 as shown in FIG. 6. The deflection causes the front arm 66, which is connected to the pivot knuckle 70, to pivot about the fourth pivot axis X9 as shown in FIG. 6. In another embodiment according to the present disclosure, and as shown in FIG. 6A, the first steering axis X4 and the second steering axis X8 are aligned so that the when the bumper 188 engages the upper steering stem 58, the first steering axis X4 and the second steering axis X8 are coaxial.

After the lever assembly 60 compresses a suitable distance, the lever assembly 60 returns to its relaxed position. Thus, the front ground-engaging wheel 16 travels vertically downward at an angle relative to the vertical axis X3 of the motorcycle 10 as shown by arrow B in FIG. 6 and FIG. 6A. The angle may be any suitable angle. This causes the lever assembly 60 to pivot about the first, second and third pivot axes X5, X6 and X7. This also causes the lower arm 142 of the lever assembly 60 to pivot about the second pivot axis X6 and lower the lower steering stem 64, the front fender 72 and the front ground-engaging wheel 16 in the angled vertically downward direction in response to the lever assembly 60 returning to its relaxed position. Further, the front arm 66, which is connected to the pivot knuckle 70, pivots about the fourth pivot axis X9 as shown in FIG. 6 and FIG. 6A.

In the foregoing description, certain terms have been used for brevity, clearness, and understanding. No unnecessary limitations are to be implied therefrom beyond the requirement of the prior art because such terms are used for descriptive purposes and are intended to be broadly construed.

While the present disclosure has been described in connection with the illustrated embodiments of the various figures, it is to be understood that other similar embodiments may be used or modifications and additions may be made to the described embodiment for performing the same function of the present disclosure without deviating there from. Therefore, the present disclosure should not be limited to any single embodiment, but rather construed in breadth and scope in accordance with the recitation of the appended claims.

What is claimed:

1. A motorcycle comprising:
   a motorcycle frame;
   at least two ground-engaging wheels operatively connected to the motorcycle frame; wherein the at least two ground-engaging wheels are a hubless configuration;
   a steering assembly comprising:
      handlebars;
      an upper steering stem;
      a lower steering stem; and
      a lever assembly intermediate the upper steering stem and the lower steering stem;
   wherein the steering assembly is operably connected to a front ground-engaging wheel.

2. The motorcycle of claim 1, wherein the lever assembly further comprises:
   an upper arm; and
   a lower arm.

3. The motorcycle of claim 2, wherein the lever assembly further comprises:
   an upper connection point;
   a central pivot point;
   a lower connection point, wherein the upper arm is pivotally connected to the upper connection point and the central pivot point, and wherein the lower arm is pivotally connected to the lower connection point and the central pivot point.

4. The motorcycle of claim 3, wherein the upper arm further comprises:
   a first upper connecting portion;
   a second upper connecting portion;
   a first upper section; and
   a second upper section.

5. The motorcycle of claim 4, wherein the lower arm further comprises:
   a first lower connecting portion;
   a second lower connecting portion;
   a first lower section; and
   a second lower section.

6. The motorcycle of claim 5, wherein the first upper section is disposed transversely left of the motorcycle frame and extends from the first upper connecting portion rearwardly and vertically at an angle relative to a longitudinal axis of the motorcycle towards the second upper connecting portion of the upper arm; and wherein the second upper section is disposed transversely right of the motorcycle and extends from the first upper connecting portion rearwardly and vertically at an angle relative to the longitudinal axis of the motorcycle towards the second upper connecting portion of the upper arm.

7. The motorcycle of claim 6, wherein the first lower section is disposed transversely left of the motorcycle frame and extends from the first lower connecting portion rearwardly and vertically at an angle relative to the longitudinal axis of the motorcycle towards the second lower connecting portion; and wherein the second lower section is disposed transversely right of the motorcycle and extends from the first lower connecting portion rearwardly and vertically at an angle relative to the longitudinal axis of the motorcycle towards the second lower connecting portion of the lower arm.

8. The motorcycle of claim 7, wherein the upper arm is pivotally connected to the upper steering stem at the second upper connection point by a first frame pin and is pivotal around a first pivot axis, wherein the upper arm is pivotally connected at the central pivot point to the lower arm of the lever assembly and is pivotal around a second pivot axis, wherein the lower arm is pivotally connected at the central pivot point to the upper arm by a second frame pin and is pivotal around the second pivot axis, and wherein the lower arm is pivotally connected to the lower steering stem at the second lower connection point by a third frame pin and is pivotal about a third axis.

9. The motorcycle of claim 5, further comprising:
a first rod extending transversely from the first upper section to the second upper section, the first rod defining a first aperture between the first upper section, the second upper section and the central pivot point; and
a second rod extending transversely from the first upper section to the second upper section, the second rod defining a second aperture between the first upper section, the second upper section and the first rod.

10. The motorcycle of claim 9, further comprising:
a third rod extending transversely from the first lower section to the second lower section, the third rod defining a third aperture between the first lower section, the second lower section and the central pivot point; and
a fourth rod extending transversely from the first lower section to the second lower section, the fourth rod defining a fourth aperture between the first lower section, the second lower section and the third rod.

11. The motorcycle of claim 1, further comprising:
a front arm operably connected to the lever assembly, the lower steering stem and the motorcycle frame.

12. The motorcycle of claim 11, further comprising:
a pivot axis positioned rearward of the lever assembly; wherein the front arm is pivotal about the pivot axis.

13. The motorcycle of claim 3, wherein the upper arm is disposed in symmetrical opposition to the lower arm.

14. The motorcycle of claim 1, wherein the handlebars further comprise:
an integrally formed unitary hollow tubing including a straight center section, a first curved section, a first elongated straight section, a second curved section, a first grip section, a third curved section, a second elongated straight section, a fourth curved section and a second grip section.

15. The motorcycle of claim 14, wherein the first curved section, the first elongated straight section, the second curved section and the first grip section are located transversely left of the motorcycle frame, and wherein the third curved section, the second elongated straight section, the fourth curved section and the second grip section are located transversely right of the motorcycle frame.

16. The motorcycle of claim 15, wherein the first curved section is located symmetrically opposite of the third curved section, the first elongated straight section is located symmetrically opposite of the second elongated straight section, the second curved section is located symmetrically opposite of the fourth curved section and the first grip section is located symmetrically opposite of the second grip section.

17. The motorcycle of claim 16, wherein the straight center section is disposed between the first curved section and the third curved section, the first curved section is disposed between the straight center section and the first elongated straight section, the first elongated straight section is disposed between the first curved section and the second curved section, the second curved section is disposed between the first elongated straight section and the first grip section, the third curved section is disposed between the straight center section and the second elongated straight section, the second elongated straight section is disposed between the third curved section and the fourth curved section and the fourth curved section is disposed between the second elongated straight section and the second grip section.

18. A method comprising:
providing a motorcycle having a steering assembly, wherein the steering assembly supports a throttle and a clutch lever and further comprises handlebars, an upper steering stem, a lever assembly and a lower steering stem operably connected to at least one ground-engaging wheel;
effecting a radial engine by actuating the throttle on the steering mechanism;
engaging a continuously variable transmission by actuating the clutch lever on the steering mechanism;
driving the motorcycle forward with the operator straddling the saddle seat; and
steering the motorcycle with the steering assembly.

19. The method of claim 18, further comprising:
driving the motorcycle over a non-uniform surface.

* * * * *